US008786681B1

(12) United States Patent
Conran et al.

(10) Patent No.: US 8,786,681 B1
(45) Date of Patent: Jul. 22, 2014

(54) STEREOSCOPIC CONVERSION

(75) Inventors: Patrick N. P. Conran, Corte Madera, CA (US); Douglas Moore, San Francisco, CA (US); Jason Billington, San Francisco, CA (US)

(73) Assignee: Lucasfilm Entertainment Company, Ltd., San Francisco, CA (US)

( * ) Notice: Subject to any disclaimer, the term of this patent is extended or adjusted under 35 U.S.C. 154(b) by 361 days.

(21) Appl. No.: 13/176,504

(22) Filed: Jul. 5, 2011

(51) Int. Cl.
*H04N 15/00* (2006.01)
*G06K 9/00* (2006.01)
*G06T 1/00* (2006.01)
*G06T 15/00* (2011.01)

(52) U.S. Cl.
USPC .............. 348/47; 382/103; 345/418; 345/419

(58) Field of Classification Search
USPC .............. 348/47; 382/103, 209; 345/418–419
See application file for complete search history.

(56) References Cited

U.S. PATENT DOCUMENTS

| 2010/0182410 | A1* | 7/2010 | Verburgh et al. | 348/51 |
| 2010/0289877 | A1* | 11/2010 | Lanfranchi et al. | 348/46 |
| 2011/0050853 | A1* | 3/2011 | Zhang et al. | 348/44 |
| 2011/0304618 | A1* | 12/2011 | Chen et al. | 345/420 |

OTHER PUBLICATIONS

"Alpha to coverage" [online]. Wikipedia, 2010 [retrieved on Jul. 5, 2011]. Retrieved from the Internet: <URL: http://en.wikipedia.org/wiki/Alpha_to_coverage>.
"Mask (computing)" [online]. Wikipedia, 2011 [retrieved on Jul. 5, 2011]. Retrieved from the Internet: <URL: http://en.wikipedia.org/wiki/Mask_(computing)#Image_masks>.
"Alpha compositing" [online] Wikipedia, 2011 [retrieved on Jul. 5, 2011]. Retrieved from the Internet: <URL: http://en.wikipedia.org/wiki/Alpha_compositing>.
"RGBA color space" [online]. Wikipedia, 2011 [retrieved on Jul. 5, 2011]. Retrieved from the Internet: <URL: http://en.wikipedia.org/wiki/RGBA_color_space>.
"Method 1—Alpha Channel as a Clipping Channel" [online]. DigitalArtForm.com, 2009 [retrieved on Jul. 5, 2011]. Retrieved from the Internet: <URL: http://web.archive.org/web/20090326051320/http:/www.digitalartform.com/alphaChannel.htm>.

* cited by examiner

*Primary Examiner* — Dave Czekaj
*Assistant Examiner* — Tsion B Owens
(74) *Attorney, Agent, or Firm* — Kilpatrick Townsend & Stockton LLP

(57) ABSTRACT

A method performed by one or more processors includes: receiving model data defining a three-dimensional scene; rendering the three-dimensional scene into a primary view image showing the three-dimensional scene from a view of a primary camera; and generating, for each of at least some pixels in the primary view image, a disparity value that defines a disparity between a location of the pixel in the primary view image and an indicated location of the pixel in a secondary view image showing the three-dimensional scene from a view of a secondary camera.

20 Claims, 8 Drawing Sheets

STEREOSCOPIC CONVERSION

BACKGROUND

This document relates to stereoscopic imagery, for example, techniques for converting two-dimensional (2D) digital images into three-dimensional (3D) digital images. Object rendering is generally a process of displaying a 2D projection of a 3D data set. The 3D data set can be a mesh of vertices and edges that define geometries of physical or virtual objects. A camera or view port can be defined in space relative to the object or objects to be rendered. Object rendering has use in such fields as architecture, video games, simulators, film special effects, design visualization, and rapid prototyping.

Stereoscopic imagery is a technology for creating in the brain of a human viewer an illusion of depth in 2D images. Many stereoscopic images consist of a pair images, one to be viewed by a viewer's right eye and one to be viewed by a viewer's left eye, where the different images are presented exclusively to the viewer's respective eyes using a filtering mechanism such as chromatic or polarization filtering. The two images, sometimes called left eye view and right eye view, or primary view and secondary view, can be created by an offset pair of cameras recording the same subject, or an offset pair of virtual cameras rendering the same scene.

SUMMARY

This document describes examples of techniques and systems that can be used for converting one or more 2D images to 3D, for example to generate a 3D video from a 2D video. Such videos can include recorded media (e.g., television, theatrical movies, or design demonstrations), and/or real-time video (e.g., live television, or video games), to name just a few examples.

At the outset, a primary view image showing a scene is generated. In some implementations, the primary view image is generated by rendering pixels from a computer model of the scene (i.e., using a virtual camera in a computer-based virtual environment). The primary view image is then used in generating a secondary view image that shows the scene from a different perspective.

In a first aspect, a method performed by one or more processors includes: receiving model data defining a three-dimensional scene; rendering the three-dimensional scene into a primary view image showing the three-dimensional scene from a view of a primary camera; and generating, for each of at least some pixels in the primary view image, a disparity value that defines a disparity between a location of the pixel in the primary view image and an indicated location of the pixel in a secondary view image showing the three-dimensional scene from a view of a secondary camera.

In a second aspect, a computer system includes: a first image generator implemented in a computer readable storage device and configured to: access model data defining a three-dimensional scene; render the three-dimensional scene into a primary view image showing the three-dimensional scene from a view of a primary camera; and generate, for at least some of pixels of the primary view image, a disparity value that defines a disparity between a location of the pixel in the primary view image and an indicated location of the pixel in a secondary view image showing the three-dimensional scene from a view of a secondary camera.

In a third aspect, a computer program product is tangibly embodied in a computer-readable storage medium and includes instructions that when executed by a processor perform a method comprising: receiving model data defining a three-dimensional scene; rendering the three-dimensional scene into a primary view image showing the three-dimensional scene from a view of a primary camera; and generating, for each of at least some pixels in the primary view image, a disparity value that defines a disparity between a location of the pixel in the primary view image and an indicated location of the pixel in a secondary view image showing the three-dimensional scene from a view of a secondary camera.

Implementations can include any or all of the following features. The secondary view image is generated using the primary view image and the disparity values, wherein at least some of the pixels are repositioned according to the disparity values. Generating the secondary view image includes generating a copy of the primary view image and repositioning pixels in the copy of the primary view image according to the disparity values. Generating the secondary view image includes generating an empty image and copying the pixels from the primary view image according to the disparity values. A velocity map comprising velocity information of one or more objects in the three-dimensional scene is accessed; and motion blur is applied to the secondary view image.

The three-dimensional scene is rendered with all geometry having solid alpha, to obtain a solid alpha render; a primary coverage map and a secondary coverage map are generated using the solid alpha render; using the primary coverage map, primary RGBA channels that were previously premultiplied are un-premultiplied to obtain a primary un-premultiplied RGBA; using the secondary coverage map, secondary xy disparity vectors are un-premultiplied to obtain secondary un-premultiplied xy disparity vectors; using the secondary un-premultiplied xy disparity vectors, the primary un-premultiplied RGBA is displaced to the secondary view to obtain a secondary un-premultiplied RGBA; and the secondary un-premultiplied RGBA is premultiplied using the secondary coverage map to obtain a secondary view premultiplied RGBA; wherein the primary RGBA channels form the primary view image and the secondary view premultiplied RGBA forms the secondary view image. At least one of the primary and secondary coverage maps is an alpha channel of the solid alpha render.

A camera offset value defining an offset of the secondary camera from the primary camera is received, and the camera offset value is used in generating the disparity values. A depth value for at least one object in the three-dimensional scene is received, and the depth value is used in the generation of the disparity values. The disparity values are one-dimensional vectors. Surface correcting operations are performed before generating the disparity values.

Various implementations of the subject matter described here may provide one or more of the following potential advantages. A secondary view image for a stereoscopic image or video frame can be generated with relatively less processing, which makes the 2D to 3D image conversion more effective. A coverage map can help ensure that transparency is converted or translated correctly when the secondary view is rendered.

Details of one or more implementations are set forth in the accompanying drawings and the description below. Other features and potential advantages will be apparent from the description and drawings, and from the claims.

DESCRIPTION OF DRAWINGS

Like reference symbols in the various drawings indicate like elements.

DETAILED DESCRIPTION

Figure 1:
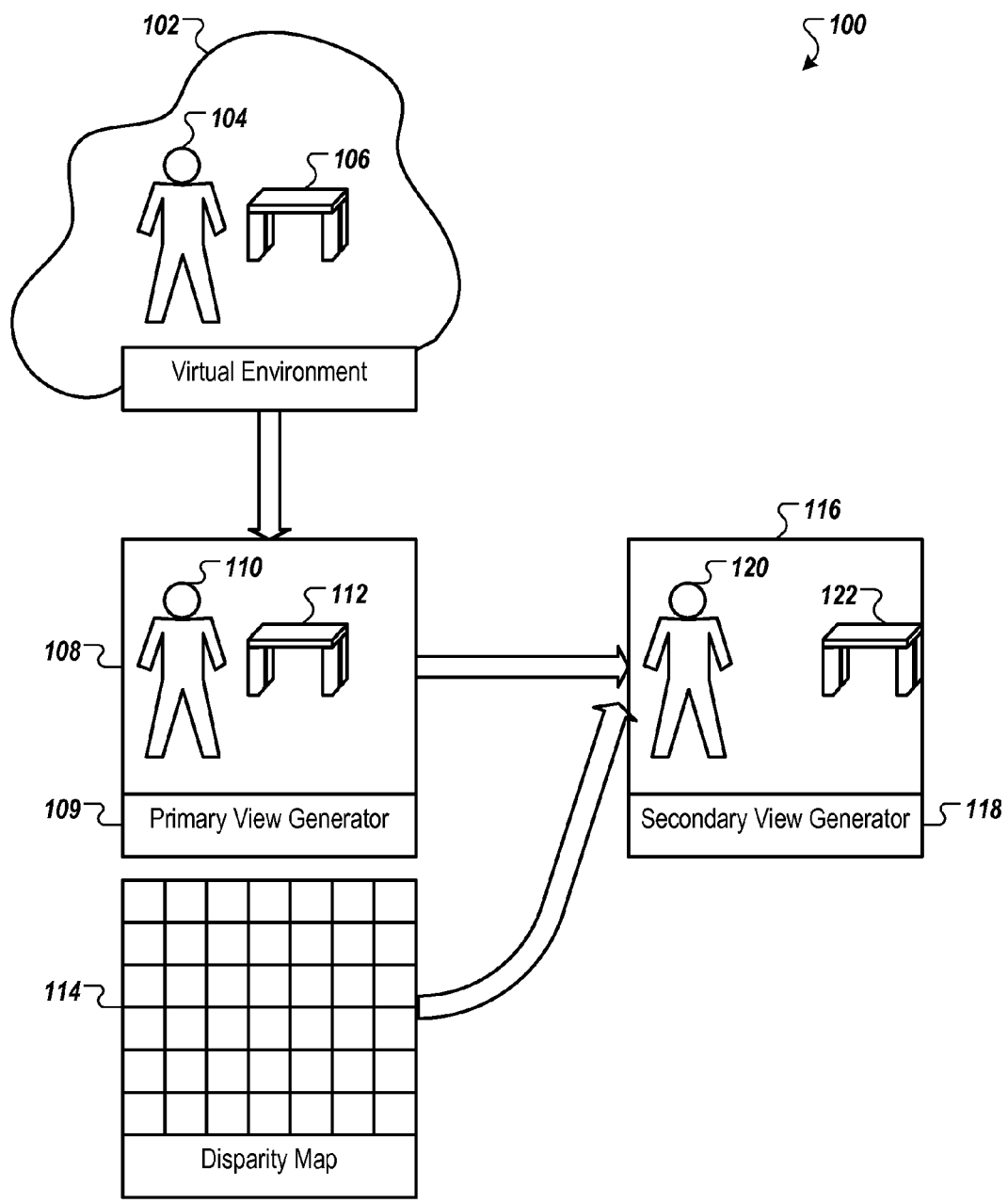
FIG. 1 is a block diagram depicting exemplary function blocks for generating a stereoscopic image of a scene.

FIG. 1 is a block diagram 100 depicting exemplary function blocks for generating a stereoscopic image of a scene. In short, first a primary view image of a scene is generated, and the primary view image is then used to generate a secondary view image, to form a stereoscopic pair of images.

The function blocks include a virtual environment 102 which is computer generated and provides the framework for defining objects and motion in 3D. Here, the virtual environment 102 currently includes 3D geometric models 104 and 106 resembling a person and a table, respectively. The models 104 and 106 can be used to generate animation such that one or both of the virtual objects represented by the model appear to move within the virtual environment 102 and/or change shape over time. A viewport (i.e., a virtual camera) can be defined in the virtual environment 102 and, using that virtual camera, a primary view 108 can be rendered by a primary view generator 109.

The primary view can be a 2D projection of at least a portion of the virtual environment 102, here including 2D projections 110 and 112 of the 3D geometric models 104 and 106, respectively. The primary view is projected based on a specified location of a virtual camera in the virtual environment 102. Additional primary views can be rendered as the virtual environment 102 changes, and this sequence of primary views can be viewed as a video of the virtual environment 102.

Here, the projections of the models 104 and 106 do not overlap each other in the primary view 108. However, overlap in projection can occur in some circumstances, for example due to the sizes of the models, their separation, and/or the location of the virtual camera. If the projections 110 and 112 were to at least partly overlap each other in the primary view, some image information from the obscured one of the models would not be present in the primary view. This lack of image information in the primary view can complicate or prevent the generation of a secondary view from the primary view, because some or all of the missing image information may be necessary for the secondary view. In some implementations, the primary view 108 can have a layered image format, wherein the respective 2D projections 110 and 112 are stored in separate layers. Such layers can reduce or eliminate the problems with missing image information.

For each pixel of the primary view 108, a disparity vector for the corresponding object in the scene, or for each pixel of each object, is determined. The disparity vector defines the correspondence between the locations of pixels of an object in a primary view of a stereoscopic image and the location of the same pixels in a secondary view. For example, the disparity vectors are calculated while the primary view 108 is being rendered. The disparity vectors are compiled in a disparity map 114. In some implementations, the disparity map 114 is generated during the rendering of the primary view 108.

To determine the disparity vectors in the disparity map 114, a camera offset value is defined that specifies a relationship between the primary view image and the secondary view image. For example, the camera offset value can be defined as the interocular distance (i.e., the approximate distance between a person's eyes).

The disparity vectors can be calculated for the depth of the object shown in each pixel of the primary view 108. For example, each disparity vector specifies a distance and/or direction that a particular pixel should be translated compared to the primary view. The disparity vector is determined based on the camera offset value and on the location of the model(s) in the virtual environment. The disparity vector is calculated by transforming the 3D position of the current shaded point, using the transform hierarchy of the scene and the projection matrix of the camera, into the 2D normalized device coordinates (NDC) of the primary camera and of the secondary camera. For example, (0,0) is the bottom left hand corner coordinate and (1,1) is the top right hand corner coordinate. The normalized disparity vector is then the difference between these two NDC vectors, and the actual disparity vector is determined by multiplying the normalized disparity vector by the pixel resolution of the images.

In addition to disparity vectors, the disparity map 114 may contain velocity values for each pixel of the primary view 108. Each velocity value can be a measure of the instant velocity of the portion of the model that the pixel represents. In some situations, different parts of a modeled object can have different velocities. For example, a velocity at any point on a rotating disc is dependent on how far from the center of rotation the point is located.

The disparity map 114 in this example has two values (disparity and velocity) per pixel, but other formats are possible. For example, a disparity map may contain only the disparity values, and a separate velocity map may contain only the velocity values. In another implementation, a map may contain disparity, velocity, and one or more other values.

A secondary view 116 will be generated by a secondary view generator 118, in part by using the primary view 108 and the disparity map 114. The disparity vectors of the disparity map 114 can be applied to the pixel locations in the primary view 108 to generate the secondary view 116. Here, as a result, the secondary view includes 2D projections 120 and 122. In this example, the secondary view is located to the right of the primary view. Also, the 2D projections 118 and 120 are farther apart horizontally than the 2D projections 110 and 112.

In some implementations, a physical camera with range finding capabilities can record physical objects and generate a depth map associated with each frame of the video. The depth map can be generated, for instance, by a laser range finder associated with the camera. The laser range finder can sample a grid of depths as the frame is being recorded. This depth map can be used to create a disparity map as described above, and this disparity map can be used to create a secondary image.

FIG. 2A-2E are diagrams of example images and example image maps for use in generating a stereoscopic image. An image 200 is a primary view of a 3D scene, a map 202 is a depth map of the scene, a map 204 is a velocity map of the scene, a map 206 is a disparity map calculated from the map 202 and a camera offset, and an image 208 is a secondary view of the scene created using the image 200 and one or more of the maps 202-206.

The image 200 can be captured or rendered from a 3D object or model, for example as described above. The image 200 may be viewed alone as a standard 2D image, and/or paired with a complementary image to form a stereoscopic pair.

The image 200 can contain a grid of pixels, each pixel containing a color value according to a color model (e.g., RGB, HSV, HSL, CMYK, etc.). The pixels can be indexed by their respective horizontal ("X") and vertical ("Y") positions in the grid. For purposes of illustration, the image 200 in FIG. 2A has a grid of only 7×6 pixels, but it will be understood that the actual resolution of the image 200 would be higher than shown in this example. A rectangular grid is shown here, but other grid shapes can be used.

The image 200 can contain two or more layers, for example one containing the human figure and one containing the table. Each layer can use the same pixel positions as the image 200. The pixel positions corresponding to the person contain the pixel value(s) representing the color of the person in that area, and the same applies to the table. Any other pixel position(s) can be empty or contain a null value. Each of these layers is created, for example, automatically during rendering of a virtual environment. For example, the layers are not necessarily bounded by an outline or identified by a human user.

The image layers can be composited and displayed as the image 200. For example, layers nearest to the camera or viewport can be displayed over one or more layers farther from the camera. This process is sometimes called the painter's algorithm.

The map 202 is a depth map of the image 200. The depth information is a value of the distance between the camera or viewport and the object shown at that pixel location. The depth map can be indexed in the same format as the pixels of the image 200, such that the index of each pixel is also the index of the depth value in the map 202 for the same pixel.

Here, two different depth values D1 and D2 are shown in the depth map 202. In the virtual environment 102 (FIG. 1), from which the image 200 was created, the table is located farther from the camera than the human figure. The D2 depth value, which is associated with the table, is therefore greater than the D1 depth value associated with the human figure.

In the example shown in the map 202, a single depth value (i.e., D1 or D2) is defined for all pixels of each object. That is, the depth values are assigned as if all parts of the object were equidistant from the camera. In some implementations, different depth values can be used for one or more parts of an object.

In some implementations, the map 202 contains depth information for any pixels that display a foreground object (i.e., the figure or table). Other pixels, by contrast, which can correspond to a background or horizon in the scene, can be empty, hold a zero value, or hold an infinity value. Other value schemes can be used.

In some implementations, depth values are stored for each layer in an image. For example, where projections of models overlap each other, the depth map can store different depth values in two or more layers for the same pixel location. In some implementations, a depth map container can hold multiple depth maps, such as one per layer in the corresponding image.

The map 204, in turn, holds velocity information for each pixel in the image 200. The velocity information is a value indicating the movement direction and speed, if any, of the object to which that pixel location corresponds. The velocity map can be indexed using the same scheme as the pixels of the image 200, for example such that the index of each pixel of the image 200 is also the index of the velocity of the same pixel in the map 204.

Assume now that the human figure in the image 200 is currently moving to the left. This can be determined from the parameters of the model used to render the image 200. In other implementations, the movement information is determined by comparing the image 200 to adjacent frames in a video clip that contains the image 200, or by another process.

Figure 2A:
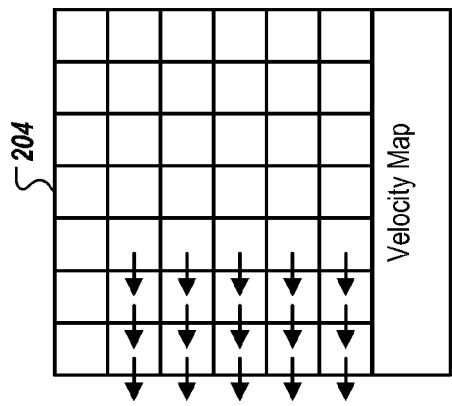
FIG. 2A-2E are diagrams of example images and example image maps for use in generating a stereoscopic image.
Figure 2B:
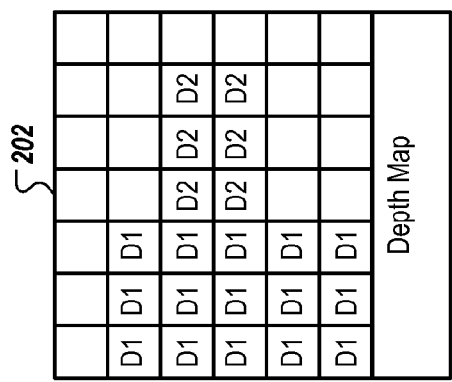
Figure 2C:
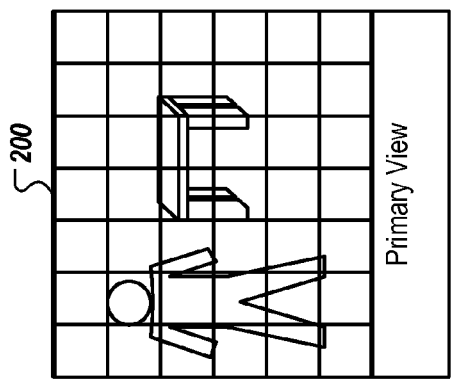
Figure 2D:
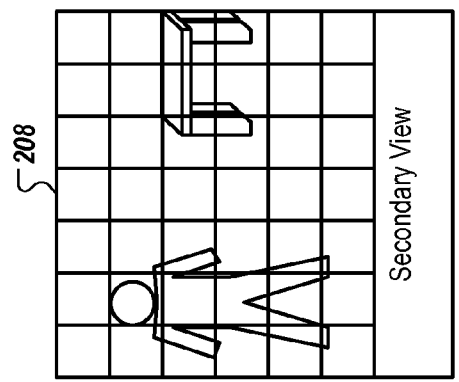
Figure 2E:
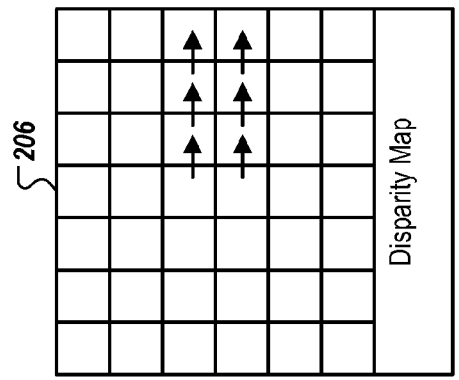

In this case, the movement to the left is represented at the corresponding grid locations by a two dimensional vector [−1, 0] (shown in FIG. 2C as an arrow pointed in the negative X direction on the map 204). If the human figure's velocity is not the same throughout the figure's surface, the velocity vectors can have different lengths and/or directions. In contrast, the table in the image 200 is stationary in this example, and its corresponding cells in the map 204 can be empty or contain a null value. The other pixels, which can correspond to a background in the scene, may be empty or contain a zero value vector (some implementations use a stationary background that is the same regardless of camera position), or a positive length vector (some implementations use a moving camera). In some implementations, the velocity map can be used for post-processing a secondary view image of a stereoscopic pair. For example, the velocity information in the map 204 can be used to add motion blur to a secondary view.

The map 206, in turn, specifies disparity information for each pixel of the image 200, and can be generated from the map 202. The disparity information about a pixel in the primary view indicates how much that pixel is relocated when the secondary view is generated. For example, the disparity information can be a vector between the respective grid locations that a feature has in the primary view and secondary view. The disparity vectors are calculated based on a camera offset and one or more of the depth values. Examples of calculating disparity values will be described below with reference to FIG. 6.

The disparity vectors can be rounded or truncated, for example to an integer value. In the example shown in the map 206, the disparity vectors in the area associated with the table are rounded to a unitary length (i.e., one grid cell) in the positive X direction. Accordingly, these vectors indicate that in the secondary image the corresponding pixels are translated horizontally by one grid cell compared to the primary image. The disparity vectors in the area associated with the human figure are rounded to zero length in this example. Likewise, these vectors indicate that there is no horizontal translation, or that any horizontal translation is not noticeable. In some implementations, other rounding or truncation principles can be used, for example so that only vectors close to zero length are truncated or rounded, or that no vectors are truncated or rounded.

The 2D secondary view in the image 208 can be paired with the image 200 to create a stereoscopic image. As with the image 200, the image 208 can contain two or more layers, such as a layer for the human figure and a layer for the table. If, for example, the human figure partly obscured the table in the image 200, the entire table could nevertheless be visible in the image 208.

In some implementations, different parts of an object are assigned different layer depth values. Such situations can create disparity vectors of different lengths, which can result in gaps or tears in the image 208. In these examples, infilling techniques may be used to fill the gaps. In some implementations, the average of color values around such a gap are determined and used for infilling. Alternatively, the brightest or darkest colors around the gap can be copied and used to fill the gap.

The images and maps described here may be generated by one or more users. For example, the image 200 and the maps 202-206 may be created by an animation artist who is tasked with generating a 2D video (i.e., a sequence of images 200) of a scene, and a disparity map for each frame of the video. The video and the maps 202-204 can later be used by a stereoscopic conversion artist to create the maps 206 and the images 208. The original 2D video and the secondary views can be combined to create a stereoscopic video of the scene shown in the images 200 and 208.

Although the disparity vectors of the map 206 in this example are calculated based on object depth and camera offset values, other methods of determining disparity vectors can be used. For example, a low resolution 'mock up' copy of a secondary view may be created and compared to a primary view. This comparison can be used to generate disparity vectors of the map 206.

Figure 3:
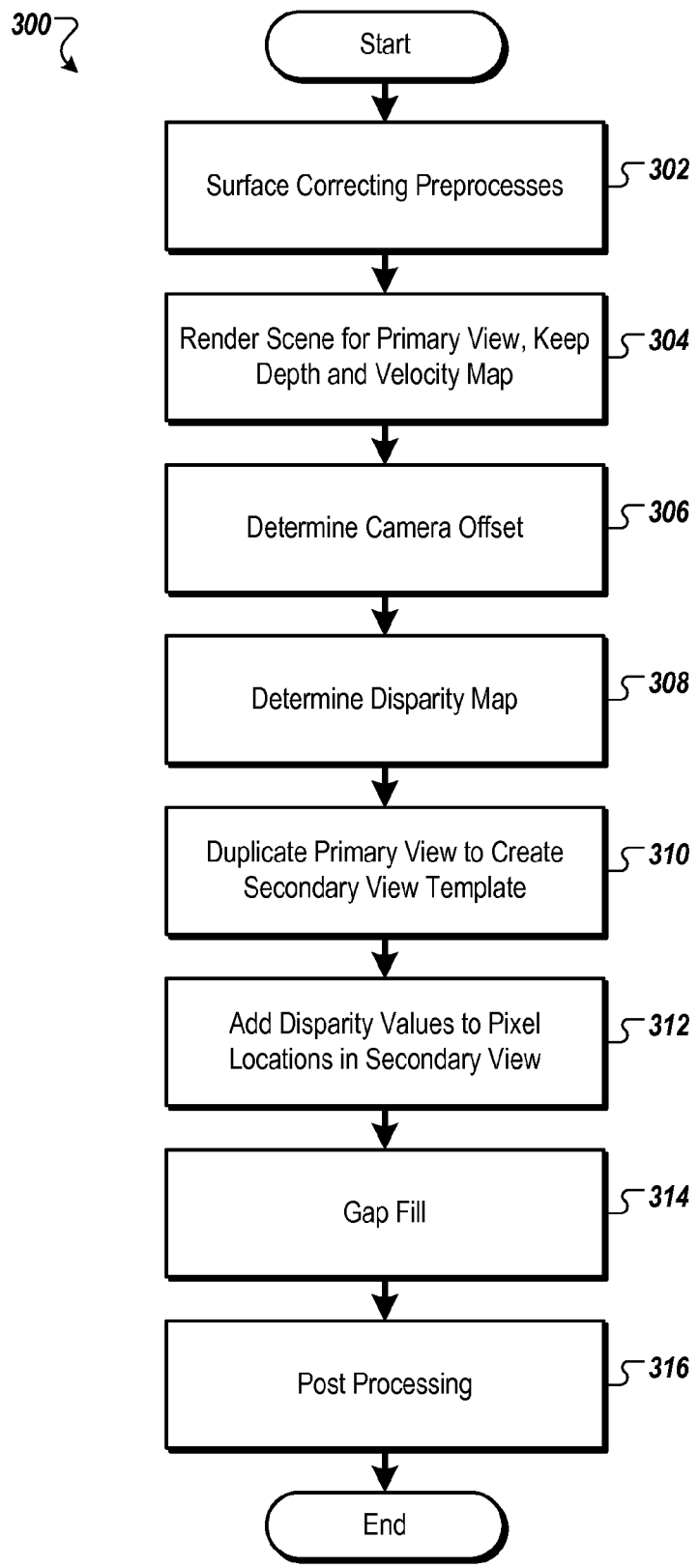
FIGS. 3-5 are flowcharts of example processes for generating a stereoscopic image.
Figure 4:
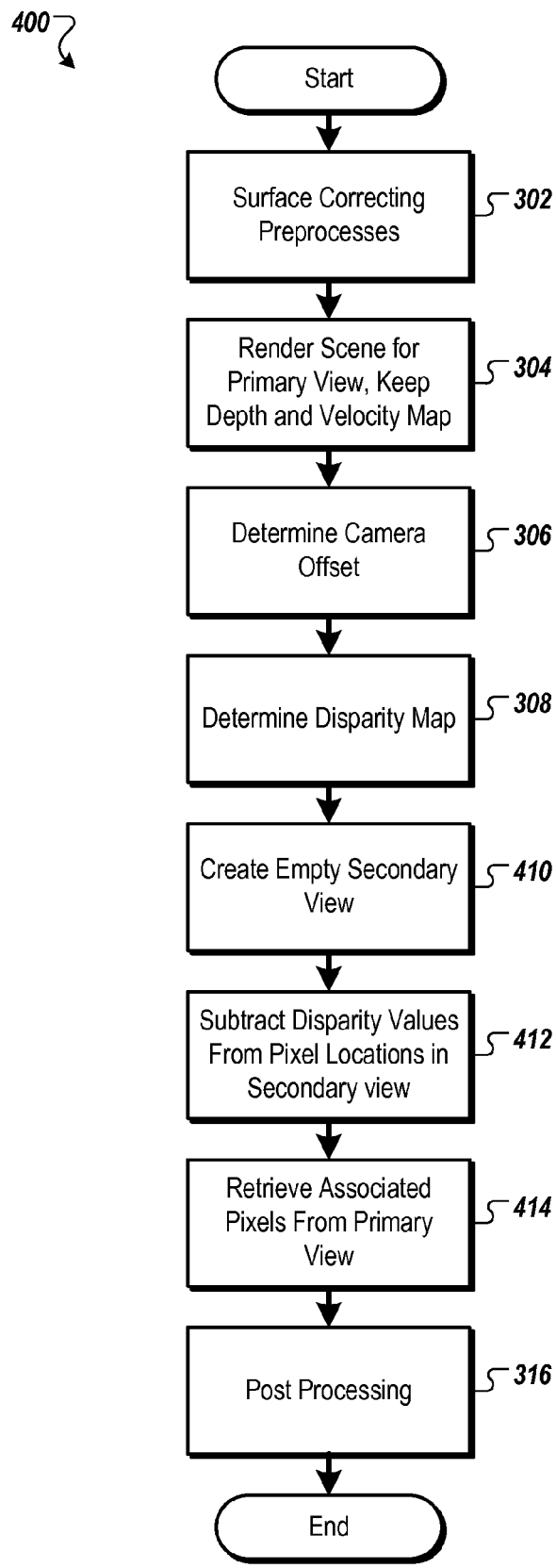
Figure 5:
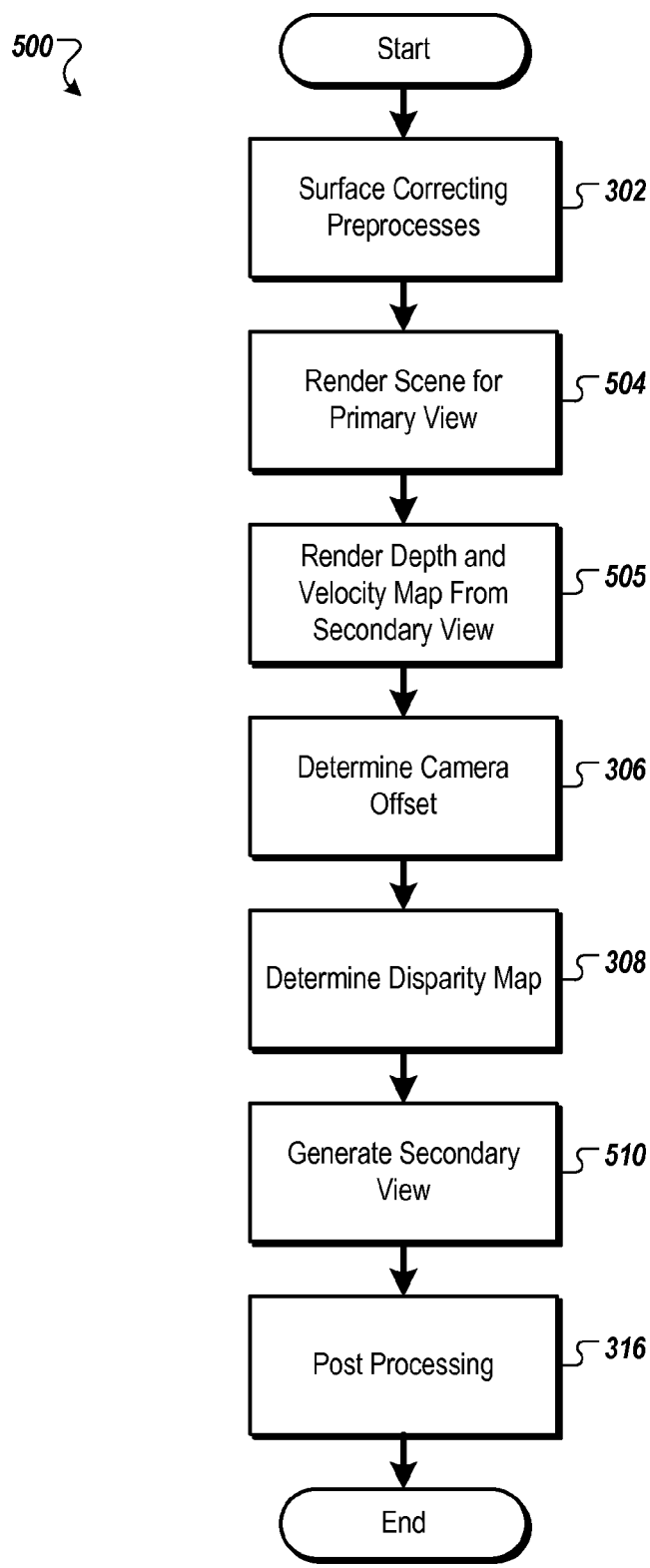

FIGS. 3-5 are flowcharts of example processes for generating a stereoscopic image. Processes 300, 400, and 500 can be performed by a computer system, such as one that is used for implementing some or all of the block diagram 100. For example, instructions stored in a computer readable medium can be executed to perform steps.

The process 300 can be considered a "push" process for creating a secondary view, because pixels from a primary view image are in a sense pushed to new locations when the secondary view image is generated. In the process 400, by contrast, a secondary view is created with a "pull" process. In the process 500, finally, a disparity map is created from the position of a secondary camera.

In the process 300, surface correcting preprocesses can be performed on an object model in step 302, perhaps to add details of an object's shape that were not fully described by an object model, or to adjust an object model in some way before the 2D image is rendered. For example, a displacement shading or tessellation process may be applied to a model. Some such processes may depend on camera position relative to the object model, and would therefore not be performed until rendering parameters are determined.

In step 304, the scene can be rendered for a primary view, and a depth and velocity map can be retained or generated. In some implementations, a depth and/or velocity map is created as part of the process of rendering a scene, and optionally retained or discarded. Alternatively, the depth and/or velocity map can be created before, after, or separate from the rendering of the scene.

In step 306, a stereoscopic camera offset can be determined. The camera offset can be based on the target size and medium that the final stereoscopic image will be displayed on, based on artistic considerations, set to values to reduce eye strain or fatigue of the viewer, and/or based on other factors. In some cases, multiple stereoscopic images of the same scene but with different camera offsets may be desired, and step 306 and the following steps may be repeated for each offset.

In step 308, a disparity map is determined for the primary view. The disparity map defines the transformation of elements from the primary view space to the secondary view space. The length of the disparity map vectors may be normalized to a distance between 0 and 1, inclusive. The direction of the disparity vectors may be constrained to horizontal only, such as in cases where the primary view and secondary view are horizontally aligned, or in order to save on processing requirements.

In step 310, the primary view is duplicated to create a secondary view template. The secondary view template begins with pixel values in the same location as in the primary view. In step 312, the disparity values are added to the pixel locations in the secondary view template, or in other words the pixel values are "pushed", to determine the final locations of the pixel values in the secondary view.

In some examples, the step 312 can produce gaps in the secondary view, for example if some pixels in an object are moved more, less, or in a different direction than other pixels. In step 314, gaps can be filled, for example by sampling surrounding pixel values or by calculating a pixel value that is unlikely to be noticed.

In step 316, post processes may be applied to the secondary view. Some post processes, such as motion blur, may use the velocity map retained or generated in the step 304. In some implementations, the process 300 can be configured such that the step 316 can be performed before the step 314.

Referring now also to FIG. 4, in the process 400, one or more of the steps 302-308 can be performed similar to in the process 300 to generate a primary view image and a disparity map. In step 410, an empty secondary view can be created. The empty secondary view can be an image file in the same format as the primary view that is empty or contains null values in the pixel locations.

In step 412, for each of the pixels in the empty secondary view, the associated disparity vector in the disparity map can be subtracted from the pixel location to determine a source pixel location in the primary image. In step 414, the pixel value in the source pixel location can be retrieved, or in other words the pixel values are "pulled", to be copied into the secondary view.

The step 316 can be performed, in a similar way as described above for the process 300, to apply post processes, such as motion blur, to the secondary view.

Referring now also to FIG. 5, in the process 500, the step 302 can be performed similar to the above description regarding the processes 300 and 400. In step 504, the scene can be rendered from the primary view. In this example, depth information used to render the scene can be discarded or ignored. In step 505, a depth and velocity map is rendered from a secondary view. The secondary view can be defined, for example, as an offset from the primary view, or according to the global coordinate space of the scene. In some implementations, the depth map can be rendered after multiple frames of a video are rendered for the primary view. For example, a complete scene can be animated and rendered for the primary view. After inspection by animation artists, the primary scene can be approved, and depth and velocity map rendering from the second view for all frames can be initiated with the same scene animation sequence.

The steps 306 and 308 can be performed similar to the above description of the processes 300 and/or 400 to generate a disparity map. In some implementations, the camera offset is known from the step 505. In step 510, a secondary view is generated, for example according to either the push or pull processes 300 and 400. In some implementations, the vectors of the disparity map may be of the same magnitude as the vectors in the disparity maps in the processes 300 and 400, but of the opposite direction. In these cases, the push or pull steps can be modified (e.g., by changing additions to subtractions) to account for this difference.

The step 316 can be performed, in a similar way as described above for the process 300, to apply post processes, such as motion blur, to the secondary view.

Figure 6:
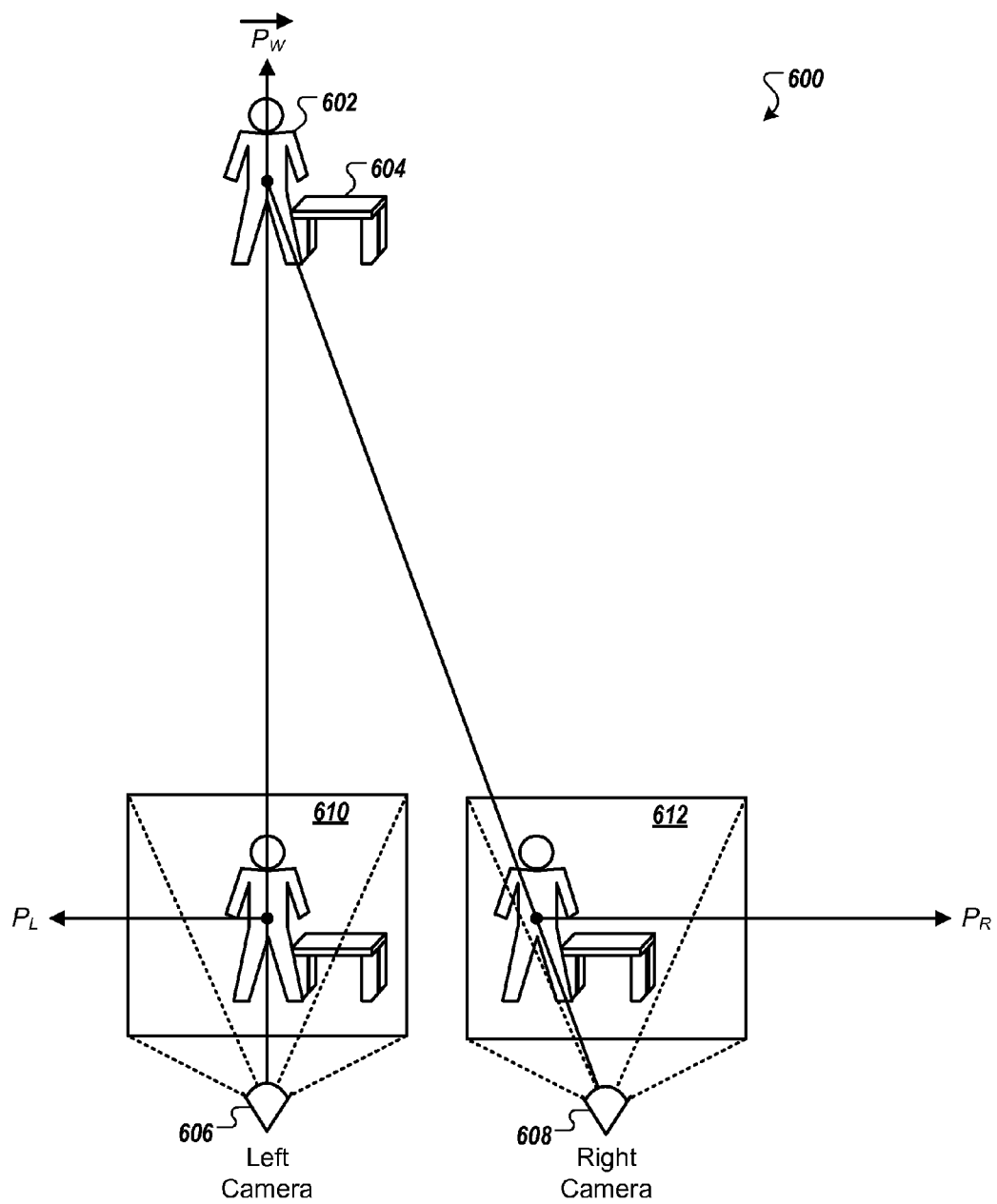
FIG. 6 shows an example of calculating disparity values.

FIG. 6 shows an example of calculating disparity values. Here, an environment 600 is schematically shown to include 3D models 602 and 604, respective left and right virtual cameras 606 and 608, and respective left-camera and right-camera views 610 and 610. In this example, the left-camera view 610 generated by the left virtual camera 606 is the primary view and the right-camera view 612 generated by the right virtual camera 608 is the secondary view.

Here, an arbitrary pixel in the projection of the 3D model 602 in the left-camera view 610 will be referred to as $P_l$. The disparity value for this pixel is now to be calculated and used in generating the corresponding projections in the right-camera view 612. First, the depth of this pixel can be obtained from a depth map, for example as described above, and the depth value is here referred to as $D_l$.

Second, a vector is created between the left virtual camera 606 and the pixel $P_l$. The vector is then converted from camera space to world space. Here, a function that transforms a point from camera space to world space is referred to as $f_L$, and the operation can be expressed thus:

$$P_w = f_L(P_l)$$

When the vector is extended to depth $D_l$, the point $P_w$ will be rendered.

A vector from the left virtual camera 606 to the point $P_w$ is referred to as $\vec{P}_w$. Using this vector, a world point S can be calculated as $$S = E(\vec{P}_w, D_l)$$

where E is the function that computes the point at the given distance along a vector.

A point in the camera space of the right virtual camera 608 is then calculated and is here referred to as $P_r$:

$$P_r = f_R^{-1}(S)$$

where $f_R^{-1}$ is the function that transforms a world space point to the right (i.e., "R") camera space.

The disparity value at the pixel $P_l$ can then be calculated as:

$$(P_r \cdot x - P_l \cdot x, P_r \cdot y - P_l \cdot y).$$

Accordingly, disparity values can be calculated for each pixel in the primary view and thereafter be used in rendering the secondary view.

Figure 7:
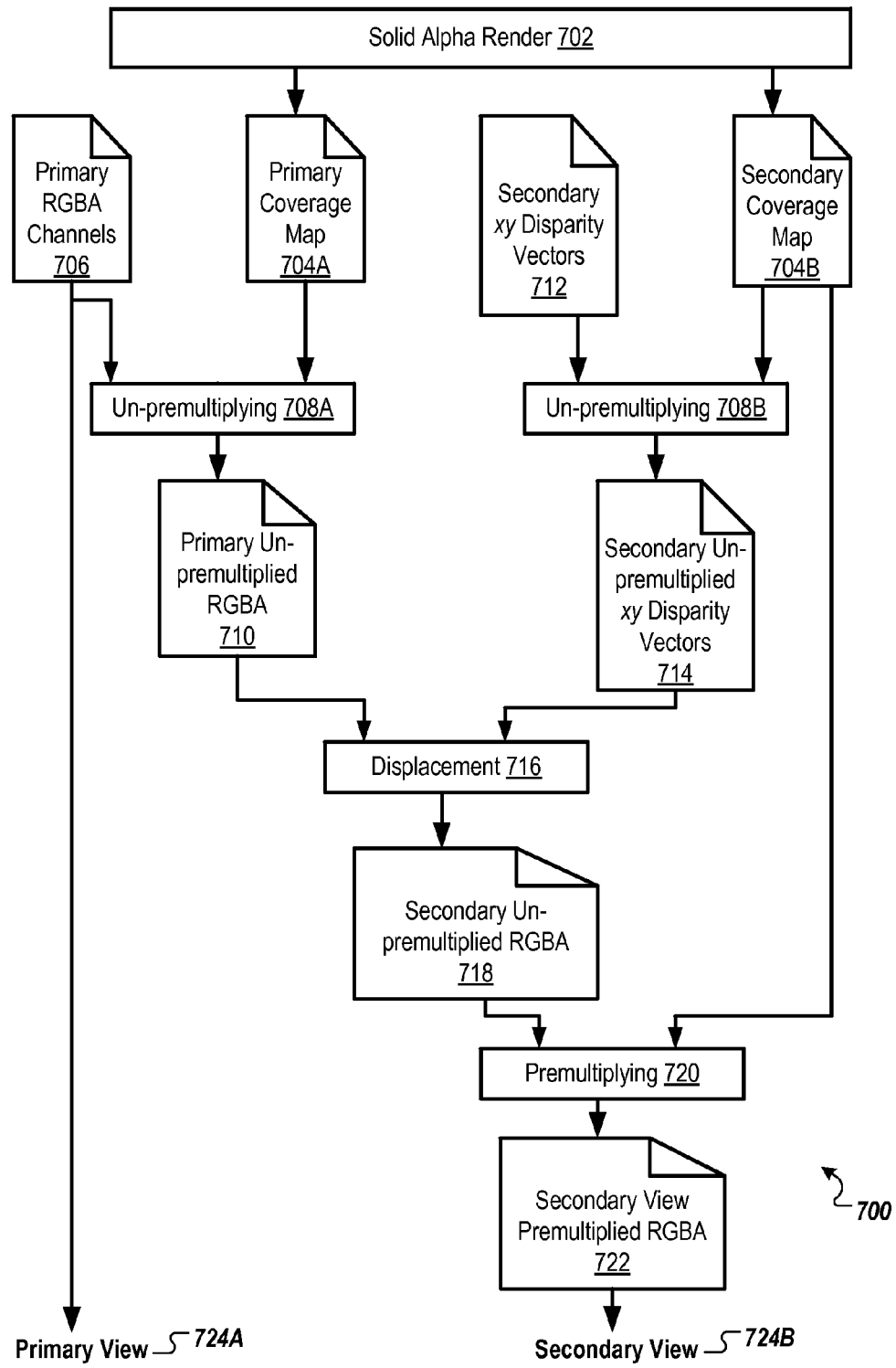
FIG. 7 schematically shows an example of a process.

FIG. 7 schematically shows an example of a process 700. The process 700 involves using coverage maps from both primary and secondary views to define which pixels in the primary view are to be displaced. Such processing can for example be useful when converting object edges or transparent objects. Generally, antialiasing measures that are performed as part of rendering cause semitransparent pixels to be placed on edges of objects. Some computer-generated objects are defined to have transparency, for example glass objects. Particularly, the coverage map(s) can help ensure that transparency is converted or translated correctly when the secondary view is rendered.

In the process 700, a solid alpha render 702 is performed. The solid alpha render 702 involves a render of the scene with all geometry having solid alpha. For example, an alpha value of one means the pixel has no transparency and is therefore opaque. Any suitable rendering process(es) can be used, including, but not limited to, a rendering process performed by the tool RenderMan from Pixar.

Here, a primary coverage map 704A and a secondary coverage map 704B result from the solid alpha render 702. In some implementations, one or both of the coverage maps 704A-B are obtained from the alpha channel of the disparity renders with all transparency having been turned off. That is, the coverage map may be the alpha of the disparity map.

Primary RGBA channels 706 are also used in the process 700. The primary RGBA channels 706 are obtained in a rendering step where the alpha values are not solid, unlike in the solid alpha render 702. The primary RGBA channels 706 were premultiplied as a result of the rendering process. That is, for each pixel an RGB color value has been multiplied with the alpha value for that pixel. For example, the values can be premultiplied as part of antialiasing measures in the rendering.

In a step 708A, the primary RGBA channels 706 are un-premultiplied using the primary coverage map 704A. That is, the RGBA channels 706 are here not un-multiplied by their own alpha channel, but rather it is the primary coverage map 704A that is used to correct for the antialiased edges from the rendering process. The step 708A generates a primary un-premultiplied RGBA 710.

Secondary xy disparity vectors 712 are also un-premultiplied, in a step 708B. Here, the secondary coverage map 704B is used to un-premultiply the secondary xy disparity vectors 712. The secondary xy disparity vectors 712 indicate the amount of displacement of certain pixels in the secondary view compared to their positions in the primary view. The step 708B generates secondary un-premultiplied xy disparity vectors 714.

Next, a displacement 716 is performed. Particularly, the secondary un-premultiplied xy disparity vectors 714 are used in displacing the primary un-premultiplied RGBA 710 to the secondary view. The displacement 716 generates a secondary un-premultiplied RGBA 718 which has the proper pixel displacement according to the secondary un-premultiplied xy disparity vectors 714.

Given that the secondary un-premultiplied RGBA 718 has the correct pixel displacement, a premultiplication is performed in step 720. Particularly, the secondary un-premultiplied RGBA 718 is premultiplied using the secondary coverage map 704B. The step 718 generates a secondary view premultiplied RGBA 722.

In conclusion, the primary RGBA channels 706 form a primary view 724A, and the secondary view premultiplied RGBA 722 forms a secondary view 724B. The primary and secondary views 724A-B can be used as the respective left-eye and right-eye images in a stereoscopic pair, for example.

Figure 8:
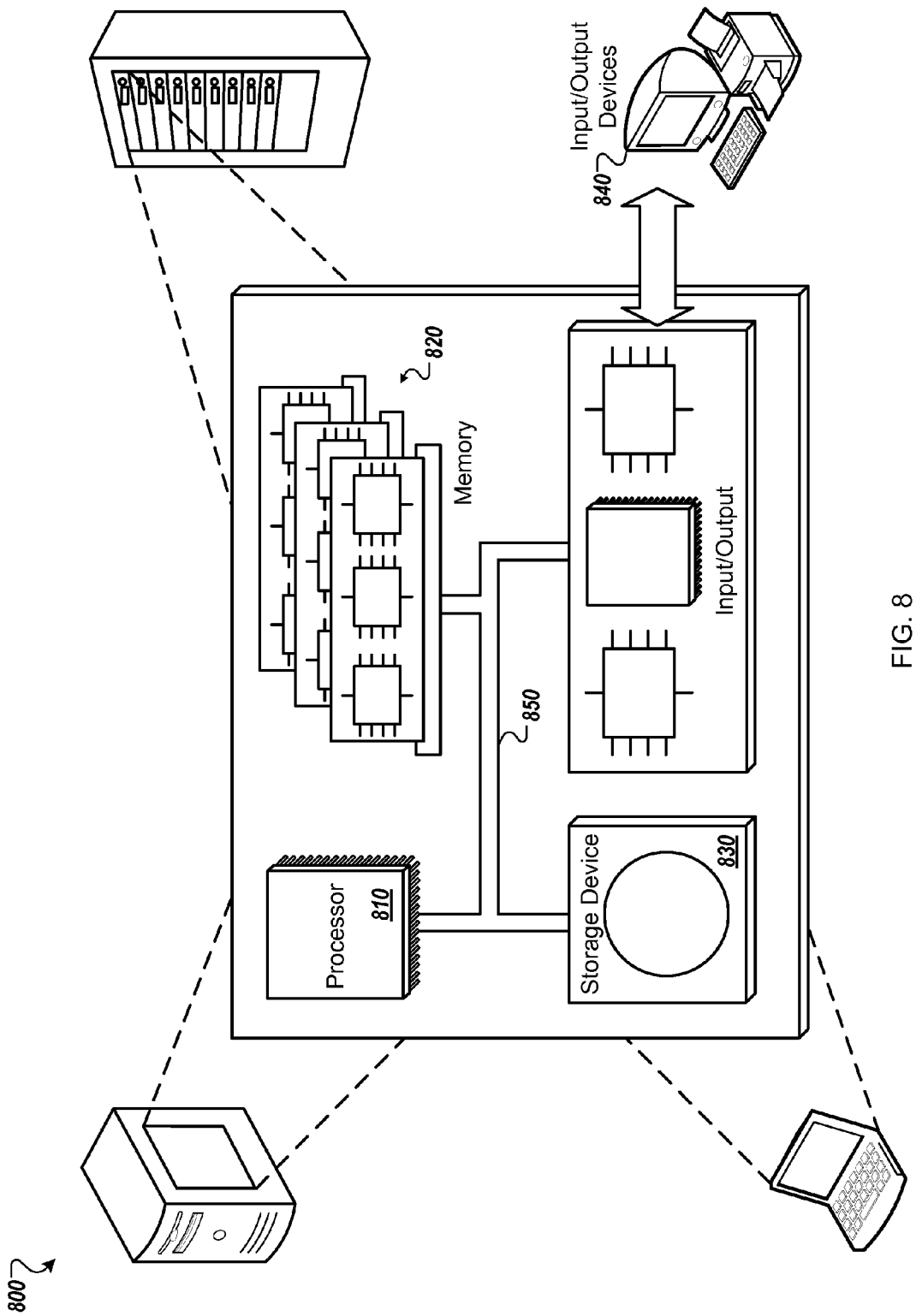
FIG. 8 is a block diagram of a computing system that can be used in connection with computer-implemented methods described in this document.

FIG. 8 is a schematic diagram of a generic computer system 800. The system 800 can be used for some or all of the operations previously, according to one implementation. The system 800 includes a processor 810, a memory 820, a storage device 830, and an input/output device 840. Each of the components 810, 820, 830, and 840 are interconnected using a system bus 850. The processor 810 is capable of processing instructions for execution within the system 800. In one implementation, the processor 810 is a single-threaded processor. In another implementation, the processor 810 is a multi-threaded processor. The processor 810 is capable of processing instructions stored in the memory 820 or on the storage device 830 to display graphical information for a user interface on the input/output device 840.

The memory 820 stores information within the system 800. In some implementations, the memory 820 is a computer-readable medium. The memory 820 is a volatile memory unit in some implementations and is a non-volatile memory unit in other implementations.

The storage device 830 is capable of providing mass storage for the system 800. In one implementation, the storage device 830 is a computer-readable medium. In various different implementations, the storage device 830 may be a floppy disk device, a hard disk device, an optical disk device, or a tape device.

The input/output device 840 provides input/output operations for the system 800. In one implementation, the input/output device 840 includes a keyboard and/or pointing device. In another implementation, the input/output device 840 includes a display unit for displaying graphical user interfaces.

Some features described can be implemented in digital electronic circuitry, or in computer hardware, firmware, software, or in combinations of them. The apparatus can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, some features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

Some features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

A number of implementations have been described. Nevertheless, it will be understood that various modifications may be made without departing from the spirit and scope of this disclosure. Accordingly, other implementations are within the scope of the following claims.

What is claimed is:

1. A method performed by one or more processors, the method comprising:
   receiving model data defining a three-dimensional scene;
   rendering the three-dimensional scene into a primary view image showing the three-dimensional scene from a view of a primary camera;
   rendering the three-dimensional scene with at least one item of geometry having solid alpha to obtain a solid alpha render;
   generating a primary coverage map and a secondary coverage map using the solid alpha render;
   generating, for each of at least some pixels in the primary view image, a disparity value that defines a disparity between a location of the pixel in the primary view image and an indicated location of the pixel in a secondary view image showing the three-dimensional scene from a view of a secondary camera, wherein the secondary view image is generated using at least the primary and secondary coverage maps.

2. The method of claim 1, further comprising generating the secondary view image using the primary view image and the disparity values, wherein at least some of the pixels are repositioned according to the disparity values.

3. The method of claim 2, wherein generating the secondary view image comprises generating a copy of the primary view image and repositioning pixels in the copy of the primary view image according to the disparity values.

4. The method of claim 2, wherein generating the secondary view image comprises generating an empty image and copying the pixels from the primary view image according to the disparity values.

5. The method of claim 2, further comprising accessing a velocity map comprising velocity information of one or more objects in the three-dimensional scene; and applying motion blur to the secondary view image.

6. The method of claim 2, the method further comprising:
   un-premultiplying, using the primary coverage map, primary RGBA channels that were previously premultiplied, to obtain a primary un-premultiplied RGBA;
   un-premultiplying, using the secondary coverage map, secondary xy disparity vectors to obtain secondary un-premultiplied xy disparity vectors;
   displacing, using the secondary un-premultiplied xy disparity vectors, the primary un-premultiplied RGBA to the secondary view, to obtain a secondary un-premultiplied RGBA; and
   premultiplying the secondary un-premultiplied RGBA, using the secondary coverage map, to obtain a secondary view premultiplied RGBA;
   wherein the primary RGBA channels form the primary view image and the secondary view premultiplied RGBA forms the secondary view image.

7. The method of claim 1, wherein at least one of the primary and secondary coverage maps is an alpha channel of the solid alpha render.

8. The method of claim 1, further comprising receiving a camera offset value defining an offset of the secondary camera from the primary camera, and using the camera offset value in generating the disparity values.

9. The method of claim 8, further comprising receiving a depth value for at least one object in the three-dimensional scene, and using the depth value in the generation of the disparity values.

10. The method of claim 1, further comprising performing surface correcting operations before generating the disparity values.

11. A computer system comprising:
 a first image generator implemented in a non-transitory computer-readable storage device and configured to:
 access model data defining a three-dimensional scene;
 render the three-dimensional scene into a primary view image showing the three-dimensional scene from a view of a primary camera;
 render the three-dimensional scene with at least one item of geometry having solid alpha to obtain a solid alpha render;
 generate a primary coverage map and a secondary coverage map using the solid alpha render;
 generate, for at least some of pixels of the primary view image, a disparity value that defines a disparity between a location of the pixel in the primary view image and an indicated location of the pixel in a secondary view image showing the three-dimensional scene from a view of a secondary camera, wherein the secondary view image is generated using at least the primary and secondary coverage maps.

12. The computer system of claim 11, the system further comprising a second image generator configured to generate the secondary view image using the primary view image and the disparity values, wherein at least some of the pixels are repositioned according to the disparity values.

13. The computer system of claim 12, wherein the second image generator is further configured to generate the secondary view image by generating a copy of the primary view image and repositioning pixels in the copy of the primary view image according to the disparity values.

14. The computer system of claim 12, wherein the second image generator is further configured to generate the secondary view image by generating an empty image and copying the pixels from the primary view image according to the disparity values.

15. The computer system of claim 12, wherein the second image generator is further configured to generate a velocity map comprising velocity information of one or more objects in the three-dimensional scene; and
 wherein the second image generator is further configured to apply motion blur to the secondary view image.

16. The computer system of claim 12, wherein the second image generator is further configured to access a camera offset value defining an offset of the secondary camera from the primary camera, and to use the camera offset value in the generation of the disparity values.

17. The computer system of claim 12, wherein the second image generator is further configured to access a depth value for at least one object in the three-dimensional scene, and to use the depth value in the generation of the disparity values.

18. The computer system of claim 11, wherein the first image generator is further configured to perform surface correcting operations before generating the disparity values.

19. A computer program product tangibly embodied in a non-transitory computer-readable storage medium and comprising instructions that when executed by a processor perform a method comprising: receiving model data defining a three-dimensional scene; rendering the three-dimensional scene into a primary view image showing the three-dimensional scene from a view of a primary camera; rendering the three-dimensional scene with at least one item of geometry having solid alpha to obtain a solid alpha render: generating a primary coverage map and a secondary coverage map using the solid alpha render: generating, for each of at least some pixels in the primary view image, a disparity value that defines a disparity between a location of the pixel in the primary view image and an indicated location of the pixel in a secondary view image showing the three-dimensional scene from a view of a secondary camera, wherein the secondary view image is generated using at least the primary and secondary coverage maps.

20. The computer system of claim 11 further configured to:
 un-premultiply, using the primary coverage map, primary RGBA channels that were previously premultiplied, to obtain a primary un-premultiplied RGBA;
 un-premultiply, using the secondary coverage map, secondary xy disparity vectors to obtain secondary un-premultiplied xy disparity vectors;
 displace, using the secondary un-premultiplied xy disparity vectors, the primary un-premultiplied RGBA to the secondary view, to obtain a secondary un-premultiplied RGBA; and
 premultiply the secondary un-premultiplied RGBA, using the secondary coverage map, to obtain a secondary view premultiplied RGBA;
 wherein the primary RGBA channels form the primary view image and the secondary view premultiplied RGBA forms the secondary view image.

* * * * *